G. H. REID.
TRACTION WHEEL.
APPLICATION FILED MAY 3, 1918.
1,297,493.
Patented Mar. 18, 1919.
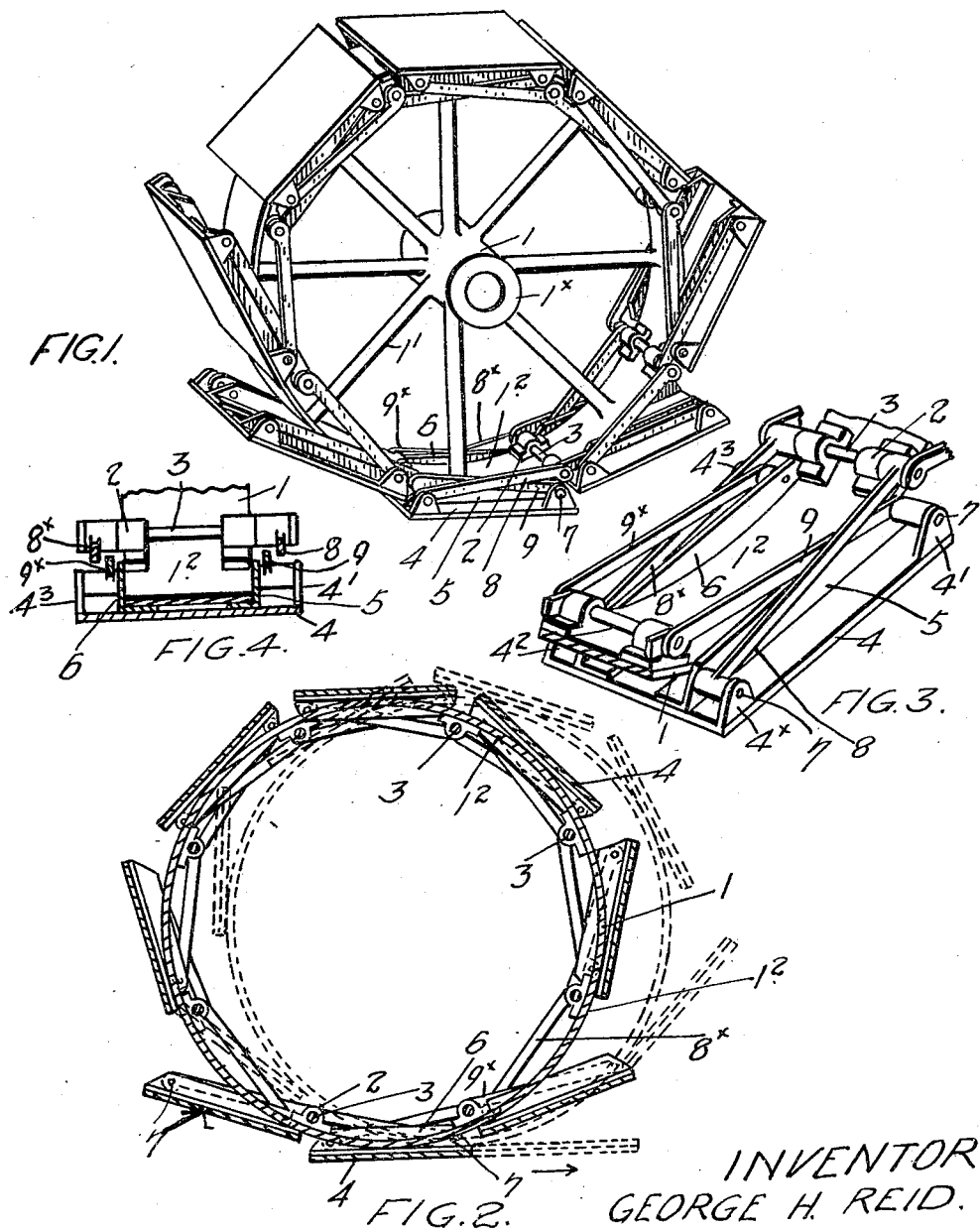
INVENTOR
GEORGE H. REID.

UNITED STATES PATENT OFFICE.

GEORGE HARSHAW REID, OF ORANGEVILLE, ONTARIO, CANADA, ASSIGNOR OF ONE-HALF TO DAVID BENT BROWN, OF ORANGEVILLE, ONTARIO, CANADA.

TRACTION-WHEEL.

1,297,493.

Specification of Letters Patent.

Patented Mar. 18, 1919.

Application filed May 3, 1918. Serial No. 232,329.

*To all whom it may concern:*

Be it known that I, GEORGE HARSHAW REID, of the town of Orangeville, in the county of Dufferin, in the Province of Ontario, Canada, have invented certain new and useful Improvements in Traction-Wheels, of which the following is the specification.

My invention relates to improvements in traction wheels and the object of the invention is to devise means for providing a continuous flat bearing surface on which the wheel may travel to prevent the wheel sinking in marshy land and which is continuously laid in front of the wheel as it travels forward and simultaneously raised behind the wheel and it consists essentially of the following arrangement and construction of parts as hereinafter more particularly explained.

Figure 1, is a perspective view of my traction wheel.

Fig. 2, is a sectional view with the hub and spokes removed and showing the position of the wheel in full lines which it assumes when bearing directly upon one of the sections of the bearing surface and in dotted lines in the position it assumes immediately prior to traveling from one bearing surface to another.

Fig. 3, is an enlarged perspective detail of one of the bearing sections and its connection to the rim of the wheel.

Fig. 4, is a cross sectional view through the center of Fig. 3.

In the drawings like characters of reference indicate corresponding parts in the various figures.

1 indicates a wheel, $1^x$ being the hub, $1'$ the spokes and $1^2$ the rim. 2 indicates bearing brackets which are secured to the inner face of the rim $1^2$ and spaced around the same at suitable equal distances apart. 3 indicates cross rods carried in the bearing 2. 4 indicates a series of bearing plates provided at the corners with bearing lugs $4^x$, $4'$, $4^2$ and $4^3$. 5 and 6 indicate angle bars secured to the plate 4 and extending longitudinally thereof and spaced apart a distance equal to the width of the wheel rim $1^2$. 7 indicates pins secured at one end in each of the lugs $4^x$, $4'$, $4^2$ and $4^3$ and at their opposite ends in the plates 5 and 6, that is to say, on one side of the bearing plate 4 the pins 7 extend between lugs $4^x$ and $4'$ and bearing plate 5 and on the opposite side between the lugs $4^2$ and $4^3$ and bearing plate 6.

It will be noticed particularly on referring to Fig. 2 that the plates 4 are arranged around the outer periphery of the wheel rim $1^2$, each plate being located between a pair of spaced apart bearings 2 and rods 3 carried thereby.

8 indicates a link bar swung at one end upon the pin 7 extending between the lug $4^x$ and angle bar 5 and at the opposite end upon a rod 3 located at the opposite end of the plate 4. 9 indicates a link bar swung at one end upon a pin 7 extending between the lug $4'$ and bar 5 and at the opposite end upon the bar 3 located adjacent to that end of the plate 4 on which the lugs $4^x$ and $4^2$ are located. The opposite side of the plate 4 is similarly connected up by links $8^x$ and $9^x$ which are secured at one end upon the pins 7 carried respectively by the lugs $4^2$ and bar 6 and lug $4^3$ and bar 6, the opposite ends of the links $8^x$ and $9^x$ being carried by the opposite ends of the rods 3 hereinbefore described.

It will thus be seen that when the plate is in the normal position, that is, when it rests horizontally on the ground as indicated by the lowermost plate in Fig. 2, that the bars 8 and 9 and bars $8^x$ and $9^x$ are arranged crosswise, one bar crossing the other intermediately of its length. The link bars 8 and 9 and $8^x$ and $9^x$ are so proportioned that when each plate approaches the ground as the wheel travels in the direction of arrow (see Fig. 2) it swings out to an angle in a tangential position to the wheel such angle being equal to the angle formed by the outer periphery of the wheel and the ground surface. Also the lengths of the plates are so proportioned that when they come into contact with the ground successively the end of one plate abuts the end of the next adjacent plate in succession thereby forming a continuous bearing surface or road bed over which the wheel travels, the corresponding plates at the rear of the wheel being carried upward successively so as to assume their normal position, that is, with the center forming the point of contact with the surface of the wheel.

It will, of course, be understood that should the wheel travel in the opposite direction to arrow that the same operation takes place as each end of each plate is similarly coupled up to the wheel rim and, therefore, the action of the plates is the same in both directions of the wheel travel.

The plates 5 and 6 not only form a bearing support for the pins 7 but they also protect the edge of the rim of the wheel insuring that the plates are held in the correct alined position and also preventing any dirt which may be gathered on the edge of the plates from collecting upon the inner peripheral face of the rim.

From this description it will be seen that I have devised a very simple device which forms a continuous bearing surface or road bed for the wheel as it travels over the surface of the land thereby forming a firm support for the same particularly when traveling over marshy land preventing sinking and miring of the wheel therein.

It will, of course, be understood that the bottom of the plates will preferably have as is usual in traction wheels gripping ribs or spades.

What I claim as my invention is:

The combination with a wheel rim, of a tread plate having bar members extending longitudinally thereof and spaced apart so as to allow the wheel rim to enter and fit therebetween, bearing members extending upwardly from each corner of the plate, links pivoted between each of the bearing members and the longitudinal bars forming the channel, and bearing members carried by the wheel rim on its interior face adjacent to each end of the tread plate carried so as to extend upwardly at each side of the wheel rim in criss-cross form, whereby a free revolving forward or backward movement of the wheel from end to end of the plate when in position on the surface of the ground is allowed.

GEORGE HARSHAW REID.

Witnesses:
J. D. TORRIE,
C. R. McKEOWN.